(12) United States Patent
Oota et al.

(10) Patent No.: US 8,118,360 B2
(45) Date of Patent: Feb. 21, 2012

(54) VEHICLE SEAT

(75) Inventors: Hiroki Oota, Inazawa (JP); Takeshi Nishiura, Nisshin (JP); Atsuki Sasaki, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 264 days.

(21) Appl. No.: 12/623,755

(22) Filed: Nov. 23, 2009

(65) Prior Publication Data

US 2010/0164272 A1    Jul. 1, 2010

(30) Foreign Application Priority Data

Dec. 25, 2008    (JP) .................................. 2008-329868

(51) Int. Cl.
*B60N 2/42* (2006.01)

(52) U.S. Cl. .............. 297/216.12; 297/216.13; 297/410; 297/408

(58) Field of Classification Search .................. 297/410, 297/408, 216.12, 216.13
See application file for complete search history.

(56) References Cited

U.S. PATENT DOCUMENTS

| | | | |
|---|---|---|---|
| 7,669,933 B2 * | 3/2010 | Watanabe ..................... | 297/410 |
| 7,866,754 B2 * | 1/2011 | Furukawa et al. ............ | 297/391 |
| 2006/0202524 A1 * | 9/2006 | Yamaguchi ............... | 297/216.12 |
| 2009/0179477 A1 | 7/2009 | Yamazaki et al. | |
| 2009/0250981 A1 | 10/2009 | Matsui | |
| 2009/0267389 A1 | 10/2009 | Otsuka | |
| 2009/0322126 A1 * | 12/2009 | Nishiura et al. .......... | 297/216.12 |

FOREIGN PATENT DOCUMENTS

WO    2008/026362    3/2008

* cited by examiner

*Primary Examiner* — Laurie Cranmer (74) *Attorney, Agent, or Firm* — Greenblum & Bernstein, P.L.C.

(57) ABSTRACT

A vehicle seat having a first support and a second support, and a first stay and a second stay for attaching a head rest to a seat back also includes a position adjusting mechanism and a retaining mechanism. The position adjusting mechanism adjusts positions of the stays with respect to the supports. The retaining mechanism prevents the stays from slipping out of the supports at positions above positions at which the stays are highest in an adjusted range by the position adjusting mechanism. A check hole for checking the connection state between two members, for example a cable and an operating rod, is formed in the first stay in such a position that the check hole is not visible when the stays are positioned in the adjusted range and is visible when the stays are prevented from slipping out of the supports by the retaining mechanism.

6 Claims, 9 Drawing Sheets

VEHICLE SEAT

INCORPORATION BY REFERENCE

The disclosure of Japanese Patent Application No. 2008-329868 filed on Dec. 25, 2008 including the specification, drawings and abstract is incorporated herein by reference in its entirety.

BACKGROUND OF THE INVENTION

1. Field of the Invention

The invention relates to a vehicle seat having a seat back and a head rest.

2. Description of the Related Art

International Publication No. WO 2008/026362 describes a vehicle seat having, for example, a seat back, a stay that is inserted into a support of the seat back, and a head rest that is attached to the seat back via the stay. The head rest includes a base member that is attached to the upper portion of the stay, a moving member that is connected to the base member so as to be able to move forward and backward, an urging member that urges the moving member forward with respect to the base member, a locking device that keeps the moving member in an initial position, and a release mechanism that unlocks (i.e., releases) the locking device. In the stay, an operating rod abuts against an end portion of a cable that extends from the seat back. Therefore, the locking device is unlocked by operating the operating rod, which is done by operating the cable. As a result, the urging member moves the moving member forward so that the head rest comes closer to the head of the user.

However, the cable (i.e., a member assembled into a seat back) and the operating rod (i.e., a member assembled into a head rest) abut against each other inside the stay which is not visible from the outside. Therefore, it is not easy to check to see if the cable and the operating rod are reliably abutted against one another (i.e., reliably connected together).

SUMMARY OF THE INVENTION

Thus, the invention provides a vehicle seat that makes it possible to visually check to see whether a seat back side member and a head rest side member are connected together within a stay.

A first aspect of the invention relates to a vehicle seat having a seat back, a first stay and a second stay that are inserted into a first support and a second support of the seat back respectively, and a head rest that is attached to the seat back via the first and second stays, which also includes a position adjusting mechanism that adjusts positions of the first and second stays with respect to the first and second supports, a retaining mechanism that prevents the first and second stays from slipping out of the first and second supports at positions above positions at which the first and second stays are highest in a range within which the positions of the first and second stays are adjusted by the position adjusting mechanism, and a first member assembled into the seat back and a second member assembled into the head rest which are connected together inside the first stay. A check hole for checking the connection state between the first member and the second member is formed in the first stay in such a position that the check hole is not visible from the outside of the seat when the first and second stays are in the range within which the positions of the first and second stays are adjusted by the position adjusting mechanism, and that check hole is visible from the outside of the seat when the first and second stays are at the positions at which the first and second stays are prevented from slipping out of the first and second supports by the retaining mechanism.

Accordingly, the position of the head rest with respect to the seat back can be adjusted by the position adjusting mechanism (during normal use). At this time, the check hole is in a concealed position (not visible) so it will not detract from the appearance of the seat. Also, the head rest is prevented from slipping off of the seat back (i.e., retained) by the retaining mechanism. At this time, the check hole is in an exposed position (visible) so it is possible to look through it to check to see whether the first member and the second member are connected. Therefore, it is possible to check to see whether the first member and the second member are connected even after the first stay has been assembled in the first support.

In the first example embodiment described above, the position adjusting mechanism may be provided between the second stay and the second support and the retaining mechanism may be provided between the first stay and the first support. Accordingly, this construction is simpler than a construction in which the both mechanisms are provided between the first stay and the first support (or the second stay and the second support). Also, the first stay and the first support which have the retaining mechanism having a simpler construction than the position adjusting mechanism, and the first member and the second member are connected inside the first stay. Therefore, the first and second members pass through the first stay easier than they do through the second stay when the first member and the second member are connected provided between the second stay and the second support.

In the example embodiment described above, the head rest may include a base member that attaches to the first and second stays, a moving member that is connected to the base member so as to move forward and backward with respect to the base member, an urging member that urges the moving member forward with respect to the base member, an initial-position keeping mechanism that keeps the moving member in an initial position with respect to the base member, and a release mechanism that unlocks the initial-position keeping mechanism. Also, the release mechanism may include the second member. Further, the first member may be a cable that is provided in the seat back, and when the first stay is inserted into the first support while an end portion of the cable is temporarily retained by the first support, the end portion of the cable may be permanently retained by the first stay and the end portion of the cable may abut against the second member inside the first stay.

As a result, it is possible to check the abutting state of the second member and the cable using the check hole. It is also possible to check to see if the cable has changed from being retained by the first support to being retained by the first stay by checking this abutting state. Further, the head rest is brought closer to the head of the user by operating the cable which moves the moving member forward. As a result, it is possible to minimize a whiplash of the user.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
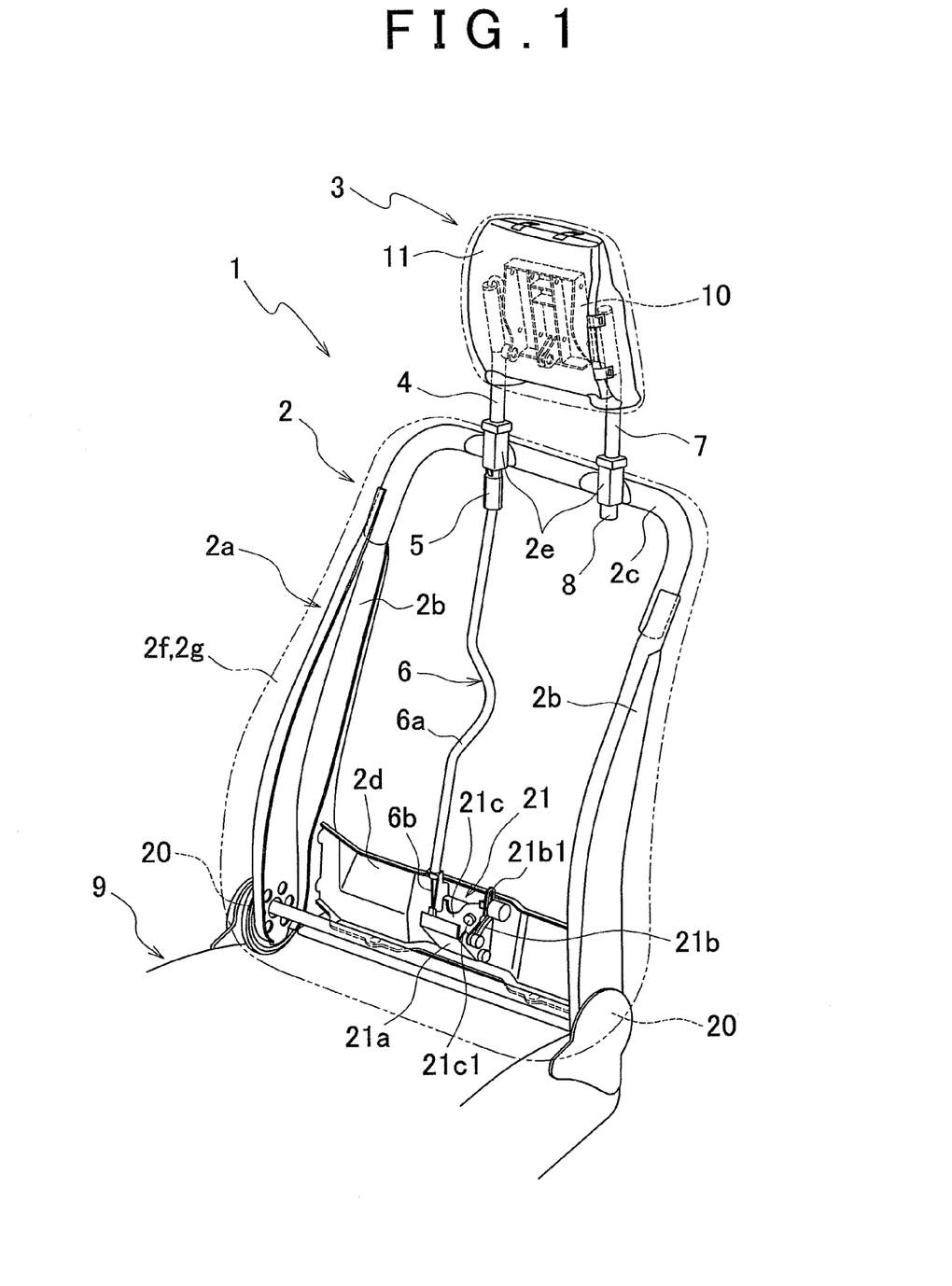
FIG. 1 is a perspective view of part of a vehicle seat.

Example embodiments of the invention will be described in greater detail below with reference to FIGS. 1 to 9. The vehicle seat 1 is a seat that may be mounted in a vehicle such as an automobile, as shown in FIG. 1, and includes a seat cushion 9, a seat back 2, and a head rest 3. A reclining device 20 is provided between the seat cushion 9 and the seat back 2, and connects to the seat cushion 9 to the seat back 2 in such a manner that enables the angle between the seat cushion 9 and the seat back 2 to be adjusted.

The seat back 2 has a frame 2a, a pad 2f that is attached to the frame 2a, and a cover 2g that covers the outer surface of the pad 2f, as shown in FIG. 1. The frame 2a includes a pair of left and right side frames 2b, an upper frame 2c that connects the upper portions of the left and right side frames 2b together, and an under frame 2d that connects the lower portions of the left and right side frames 2b together.

Figure 2:
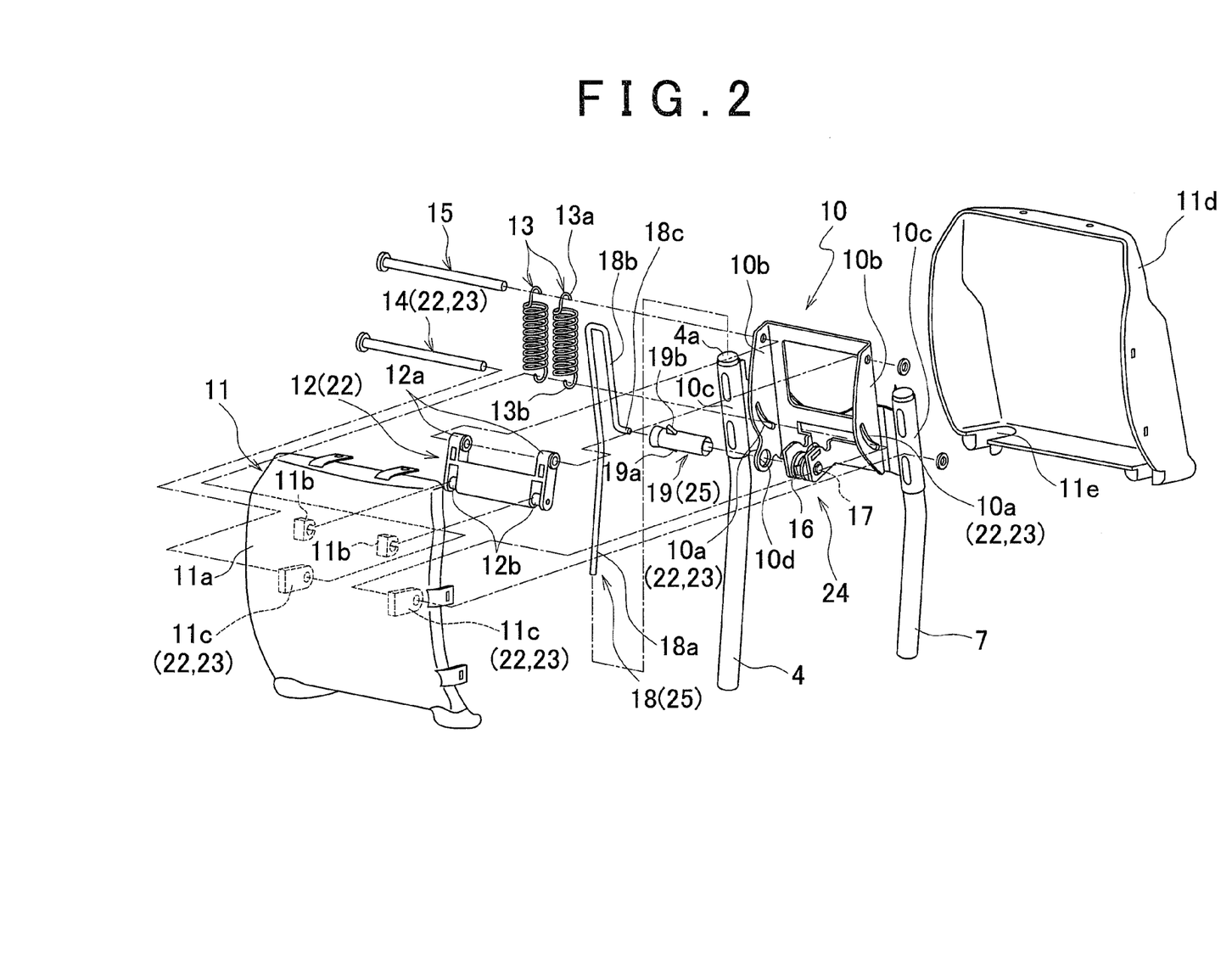
FIG. 2 is an exploded perspective view of a head rest.

The head rest 3 has a base member 10 and a moving member 11 which is attached to the base member 10 and moves forward and backward, as shown in FIGS. 1 and 2. Stays 4 and 7 are mounted to the left and right sides 10c of the base member 10, respectively. The moving member 11 has a front member 11a and a rear member 11d. When assembled, the front member 11a and the rear member 11d form a box that houses the base member 10. A pad and a cover, neither of which is shown, are attached to the outer periphery of the moving member 11. A connecting mechanism 22 is provided between the front member 11a and the base member 10, and connects the front member 11a to the base member 10 such that they are able to move relative to one another.

Figure 8:
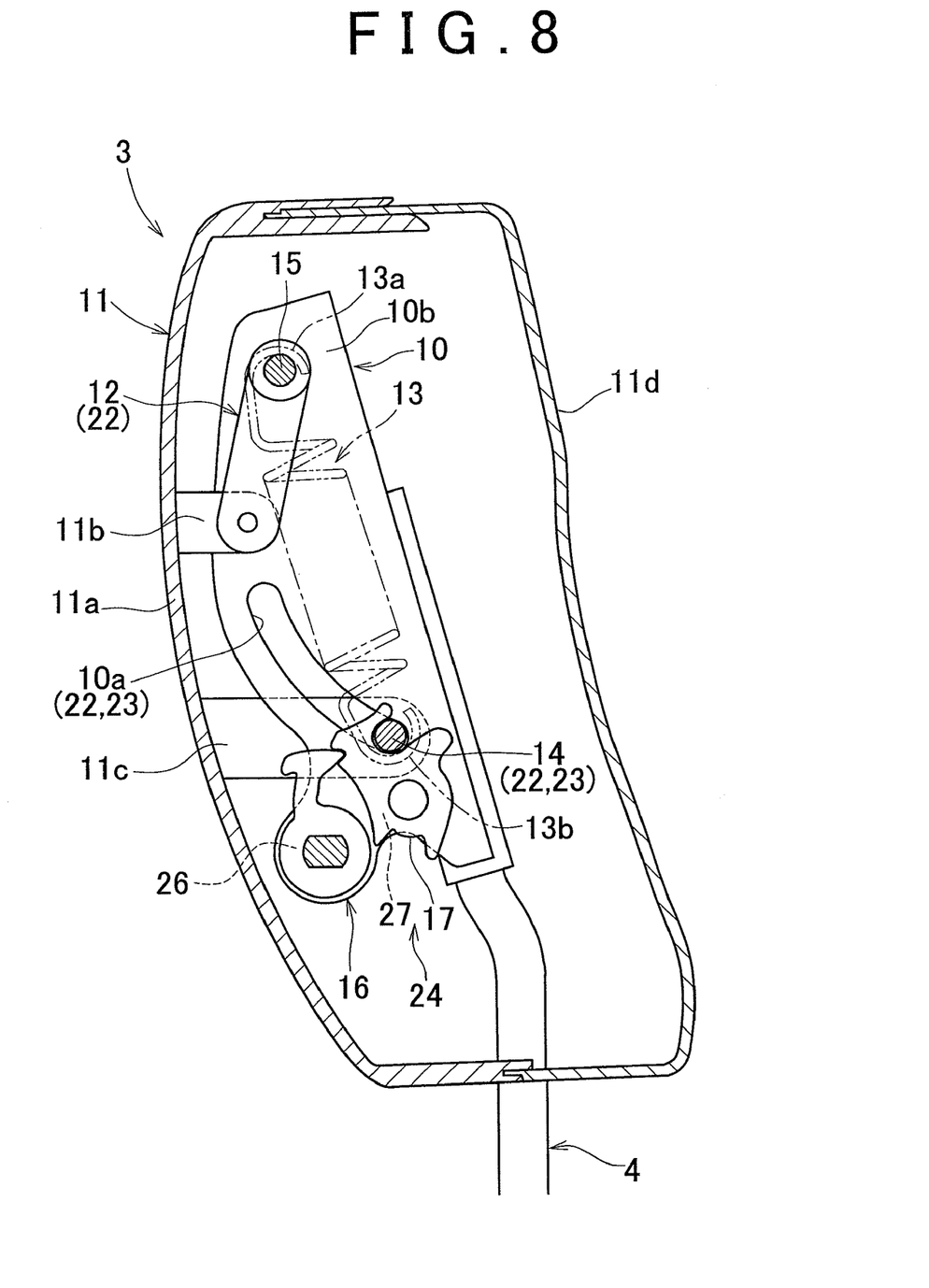
FIG. 8 is a sectional view of the head rest when the moving member is held in the initial position.

The connecting member 22 includes a connecting link 12 that rotatably connects the front member 11a to the base member 10, and a sliding mechanism 23 that slidably connects the front member 11a to the base member 10, as shown in FIGS. 2 and 8. The connecting link 12 has a pair of connecting portions 12a and rotating shafts 12b. The connecting portions 12a are rotatably connected to the base member 10 by a pin 15. The rotating shafts 12b are rotatably mounted in mounting portions 11b formed on the front member 11a.

The sliding mechanism 23 has a pin 14 and a slide groove 10a, as shown in FIGS. 2 and 8. The pin 14 is inserted into a pair of protruding portions 11c formed on the back surface of the front member 11a. Slide grooves 10a are formed as through-holes in left and right wall portions 10b of the base member 10. These slide grooves 10a are each in a generally arc shape extending up and down as well as forward and backward. The pin 14 extends through these slide grooves 10a and is movably guided and supported by these slide grooves 10a.

The base member 10 is provided with an initial-position keeping mechanism 24 which keeps the moving member 11 in an initial position (i.e., a normal use position), in which it is to the rear, and urging members 13 that urge the moving member 11 forward, as shown in FIGS. 2 and 8. The urging members 13 are coil springs, the upper end portions 13a of which are retained by the pin 15 and the lower end portion 13b of which are retained by the pin 14. The urging members 13 are elastically expanded when the moving member 11 is retained in the initial position.

Figure 9:
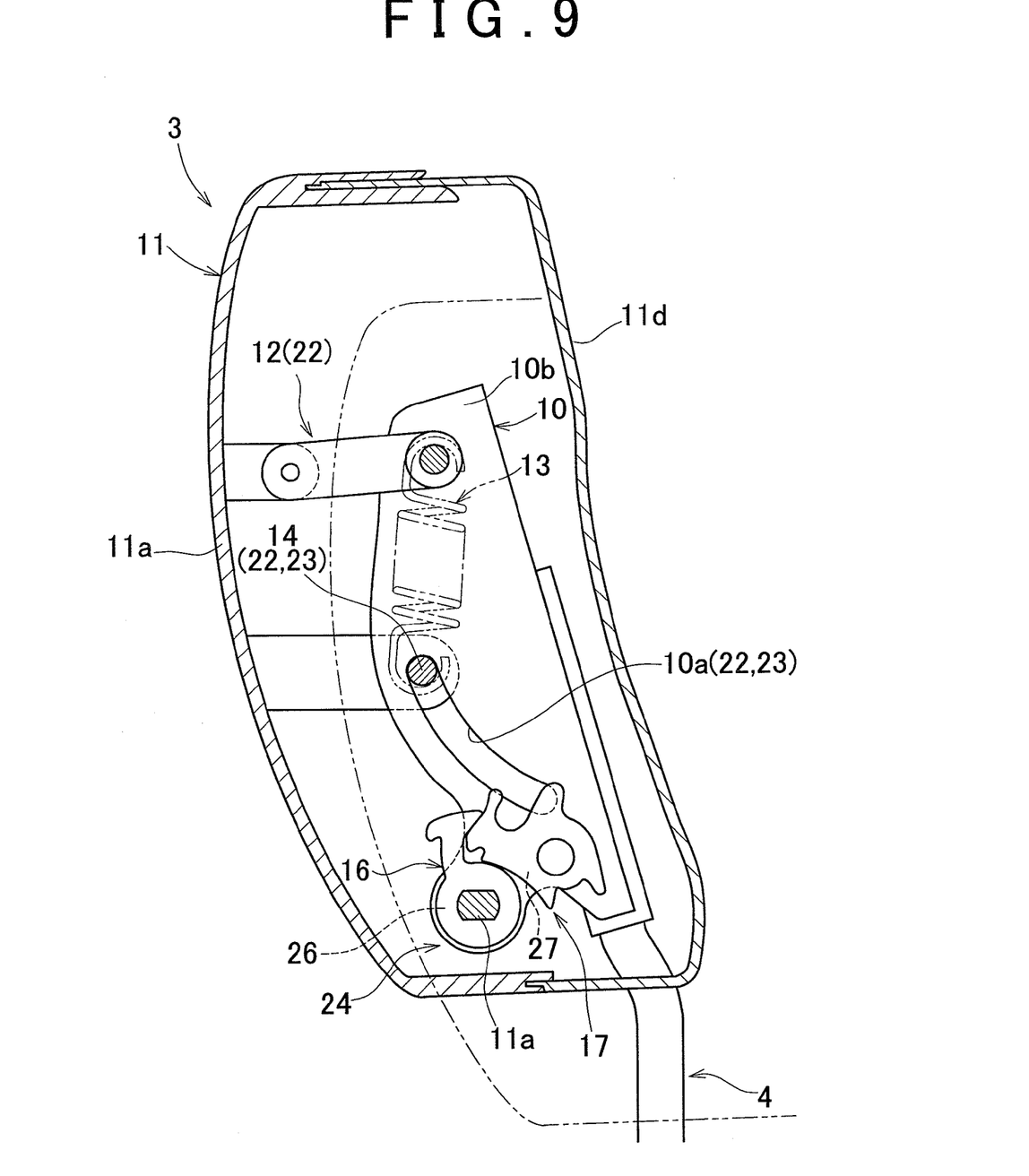
FIG. 9 is a sectional view of the head rest when the moving member has been moved to a forward position.

The initial-position keeping mechanism 24 has a first hook 16 and a second hook 17 which are rotatably attached to the base member 10, as shown in FIGS. 8 and 9. The first hook 16 is urged in the clockwise direction by the urging member 26 so as to be retained by the second hook 17. The second hook 17 holds the pin 14 and keeps the moving member 11 in the initial position. When the first hook 16 is rotated counterclockwise against the urging member 26, the second hook 17 is rotated counterclockwise by the urging member 27 and releases the pin 14. As a result, the pin 14 is moved forward along the slide grooves 10a by the urging member 13, such that the moving member 11 moves forward.

Figure 5:
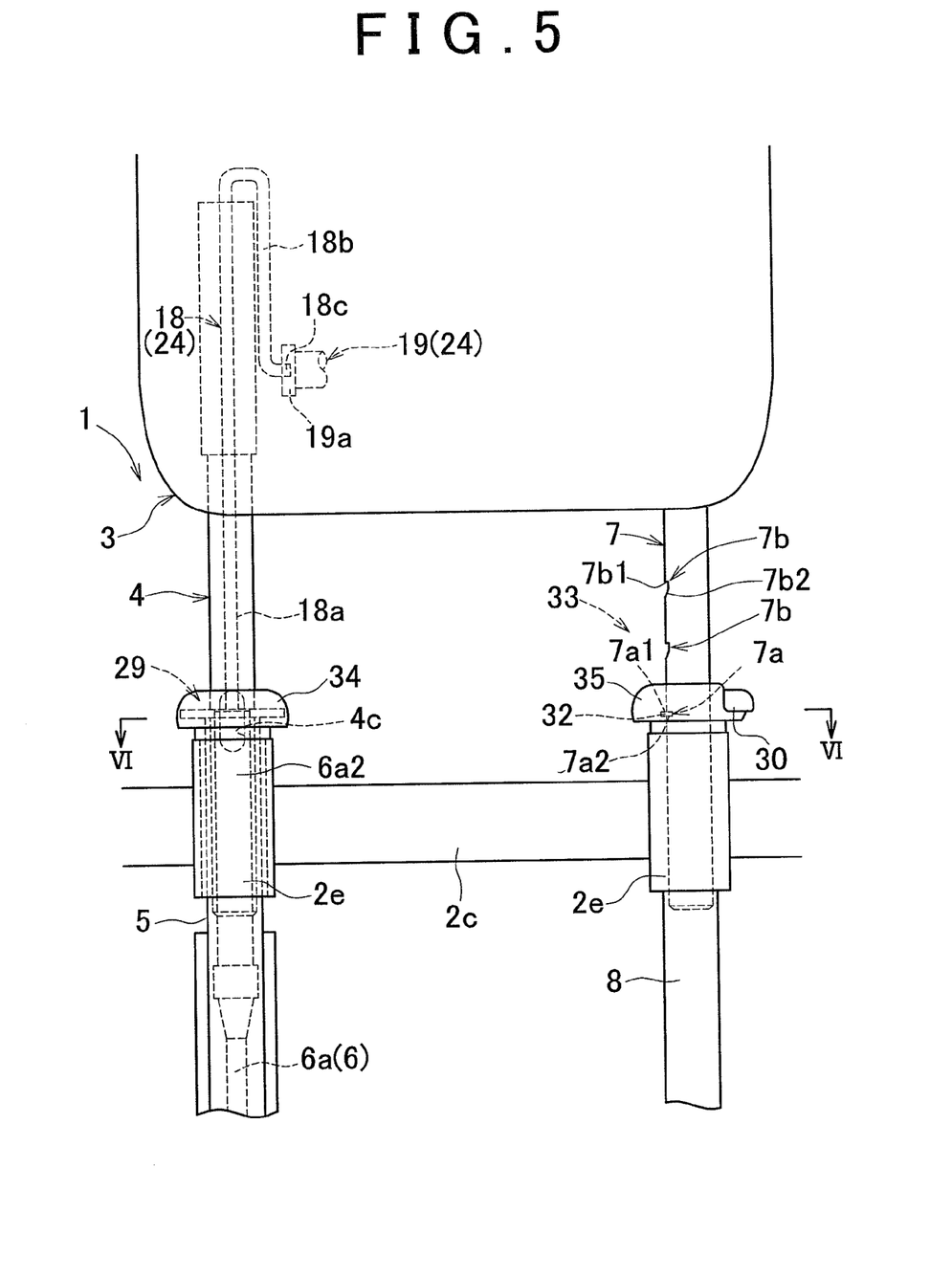
FIG. 5 is a front view of part of the vehicle seat when the head rest is in a position-adjustable range.

A release mechanism 25 that releases the initial-position keeping mechanism 24 is provided in the head rest 3, as shown in FIG. 2. The release mechanism 25 has an operating rod (i.e., a member assembled into the head rest 3) 18 and an operating shaft member 19. The operating rod 18 is a metal rod member that has a main body portion 18a, a folded-back portion 18b, and a retaining portion 18c, all of which are integrally formed together. The main body portion 18a is inserted through a shaft hole 4a in the stay 4, as shown in FIG. 5. The folded-back portion 18b is folded back from an upper end portion of the main body portion 18a and extends downward on the outer side of the stay 4. The retaining portion 18c extends out from the lower end of the folded-back portion 18b toward the operating shaft member 19 and is retained by an arm 19a of the operating member 19.

The operating shaft member 19 is cylindrical, as shown in FIG. 2, and is rotatably mounted in a through-hole 10d of the base member 10. The operating shaft member 19 includes the arm 19a that extends toward the rear from the outer peripheral surface of one end portion, and a protruding portion 19b that protrudes upward from the outer peripheral surface of the center portion. The retaining portion 18c of the operating rod 18 is retained by the arm 19a. Therefore, when the operating rod 18 is moved upward, the operating shaft member 19 rotates and the protruding portion 19b pushes against the first hook 16, thereby enabling the initial-position keeping mechanism 24 to unlock.

As shown in FIG. 1, a detecting device 21 is mounted to the under frame 2d of the seat back 2. This detecting device 21 has a tilting member 21a, a link 21b, and an arm 21c. The tilting member 21a is such that the upper end portion tilts with the lower end portion acting as the fulcrum. The front end portion of the link 21b is connected to the upper portion of the tilting member 21a, and the rear end portion of the link 21b moves up and down in conjunction with the forward-backward movement of the tilting member 21a. The arm 21c is connected to the rear end portion of the link 21b and rotates around a pin 21c1 as the link 21b pivots.

An inner cable 6b of a cable 6 is connected to the tip end portion of the arm 21c, as shown in FIG. 1. Therefore, if the vehicle is impacted from the rear and the body weight of a user is applied to the seat back 2 by inertia force, the tilting member 21a will tilt backward from that force. As a result, the rear portion of the link 21b will move upward such that the arm 21c will rotate counterclockwise and pull the inner cable 6b downward.

Figure 3:
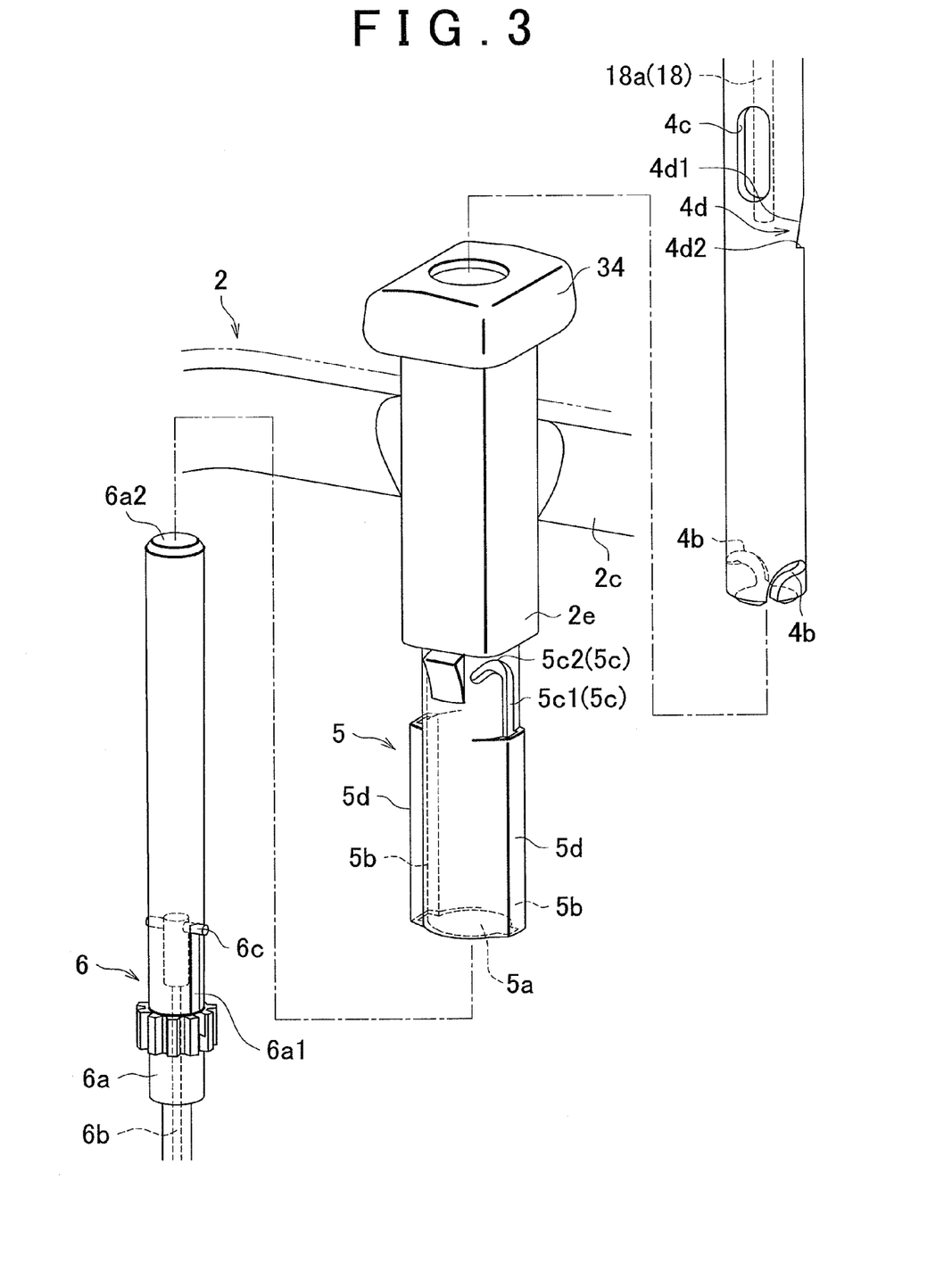
FIG. 3 is an exploded perspective view of part of the vehicle seat at an area near a support.

The cable (i.e., a member assembled into the seat back 2) 6 includes the inner cable 6b and an outer cable 6a through which the inner cable 6b passes, as shown in FIGS. 1 and 3. The lower end portion of the outer cable 6a is attached to the under frame 2d, while the lower end portion of the inner cable 6b is attached to the arm 21c. The outer cable 6a has a pair of slits 6a1 in the upper end, and a cylindrical column tip end portion 6a2. The slits 6a1 are formed one on each side of the axial center of the outer cable 6a and extending in the axial direction.

A pin 6c is attached to the upper end portion of the inner cable 6b, as shown in FIG. 3. The pin 6c is made of metal and is generally orthogonal to the upper portion of the inner cable 6b. Both end portions of the pin 6c pass through the slits 6a1 in the outer cable 6a. Therefore, the pin 6 is guided and supported by the slits 6a1 so as to be able to move up and down. The upper end portion of the cable 6 is first temporarily retained by a support 5 provided on the upper portion of the seat back 2 by the pin 6c. Then the stay 4 is inserted into the support 5, as shown in FIG. 4, such that the cable 6 is permanently retained by the stay 4.

A pair of brackets 2e are mounted to the upper frame 2c of the seat back 2, as shown in FIGS. 1 and 5. The supports 5 and 8 are mounted to these brackets 2e, and caps 34 and 35 are attached to the upper portions of these supports 5 and 8. The brackets 2e are made of metal and are cylindrical with a rectangular cross-section. The supports 5 and 8 are made of resin and are cylindrical, and fitted into the brackets 2e.

Figure 4:
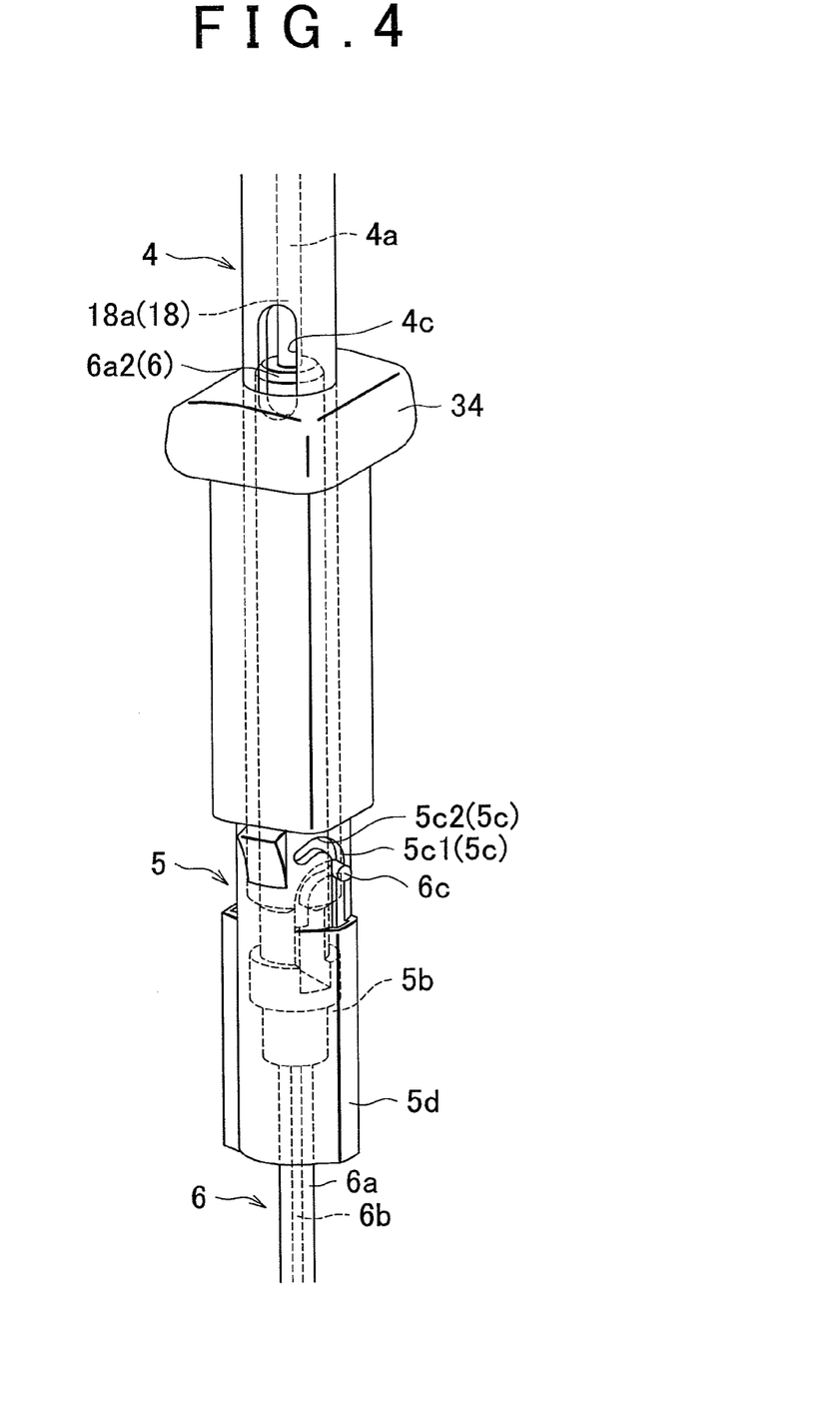
FIG. 4 is a perspective view of part of a stay, a cable, and a support during assembly.

The support 5 has a shaft hole 5a and a pair of protruding portions 5d, as shown in FIGS. 3 and 4. The protruding portions 5d protrude out in the radial direction from both sides, which sandwich the shaft hole 5a, of the outer peripheral surface of the support 5, and extend upward from the lower end portion of the support 5. A pair of guide grooves 5b and a pair of temporary retaining grooves 5c through which the pin 6c passes are formed in the support 5. The guide grooves 5b extend out from the shaft hole 5a into the protruding portions 5d, and extend upward along the protruding portions 5d from the lower end of the support 5.

Each of the temporary retaining grooves 5c passes through the outer peripheral surface and the shaft hole 5a of the support 5, and has a first slit portion 5c1 and a second slit portion 5c2, as shown in FIGS. 3 and 4. The first slit portion 5c1 is connected to the guide groove 5b and extends vertically. The second slit portion 5c2 bends back in a curved shape from the upper end portion of the first slip portion 5c1 and extends downward.

The stays 4 and 7 that are inserted into the supports 5 and 8 are made of metal and are cylindrical, as shown in FIGS. 2 and 3. A pair of main retaining grooves 4b that retain the cable 6 are formed in the lower portion of the stay 4. One main retaining groove 4b is formed on each of the left and right sides of the stay 4. The retaining grooves 4b have axisymmetric forms each other with respect to a longitudinal axis of the stay 4. The main retaining groove 4b extends in a curved shape upward from the lower end of the stay 4 and then horizontally.

When temporarily retaining the cable 6 in the support 5, the cable 6 is inserted from below the support 5, as shown in FIGS. 3 and 4. Accordingly, the pin 6c moves while being guided by the guide groove 5b and the temporary retaining groove 5c, such that it is temporarily retained by the second slit portion 5c2. As a result, the cable 6 will not fall out of the support 5.

Next, the stay 4 is inserted into the support 5, as shown in FIGS. 3 and 4. Accordingly, the pin 6c is received by the main retaining groove 4b of the stay 4 and moves along this main retaining groove 4b. The pin 6c moves up and down while rotating, and moves from the base end portion to the tip end portion of the main retaining groove 4b. At the same time, the pin 6c moves from the second slit portion 5c2 of the temporary retaining groove 5c to the first slit portion 5c1 or the guide groove 5b. As a result, the pin 6c is retained in the main retaining groove 4b. Thus, the cable 6 changes from being retained by the support 5 to being retained by the stay 4.

The main body portion 18a of the operating rod 18 is inserted into the shaft hole 4a of the stay 4, as shown in FIGS. 3 and 4. When the stay 4 is inserted into the support 5, the shaft tip end portion 6a2 of the cable 6 protrudes into the shaft hole 4a of the stay 4. Then the tip end of the main body portion 18a of the operating rod 18 is made to abut against the shaft tip end portion 6a2 of the cable 6, or the tip end of the main body portion 18a is brought close to the shift tip end portion 6a2 so that movement of the cable 6 is transmitted to the operating rod 18. This state will be referred to as a state in which the cable 6 and the operating rod 18 are connected.

Therefore, when the detecting device 21 pulls the inner cable 6b, the inner cable 6b is pulled downward, as shown in FIG. 1. However, the upper end portion of the inner cable 6b is retained by the stay 4 so the outer cable 6a moves upward relative to the inner cable 6b. As a result, the outer cable 6a pushes the operating rod 18 up, thus releasing the initial-position keeping mechanism 24. Accordingly, the moving member 11 is moved forward by the urging force of the urging member 18, such that the head rest 3 moves closer to the head of the user, as shown in FIGS. 8 and 9. As a result, it is possible to minimize a whiplash of the user.

Figure 6:
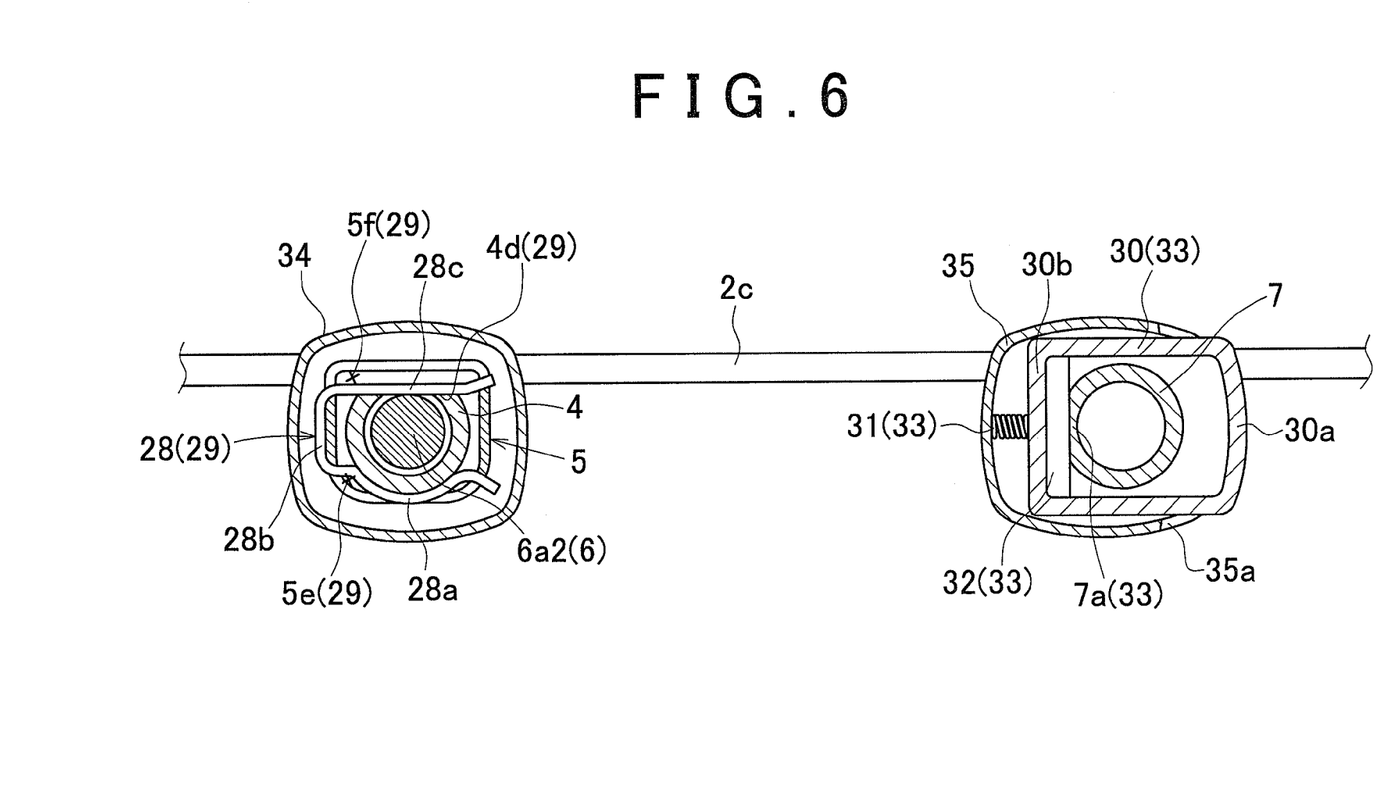
FIG. 6 is a sectional view taken along line VI-VI in FIG. 5.
Figure 7:
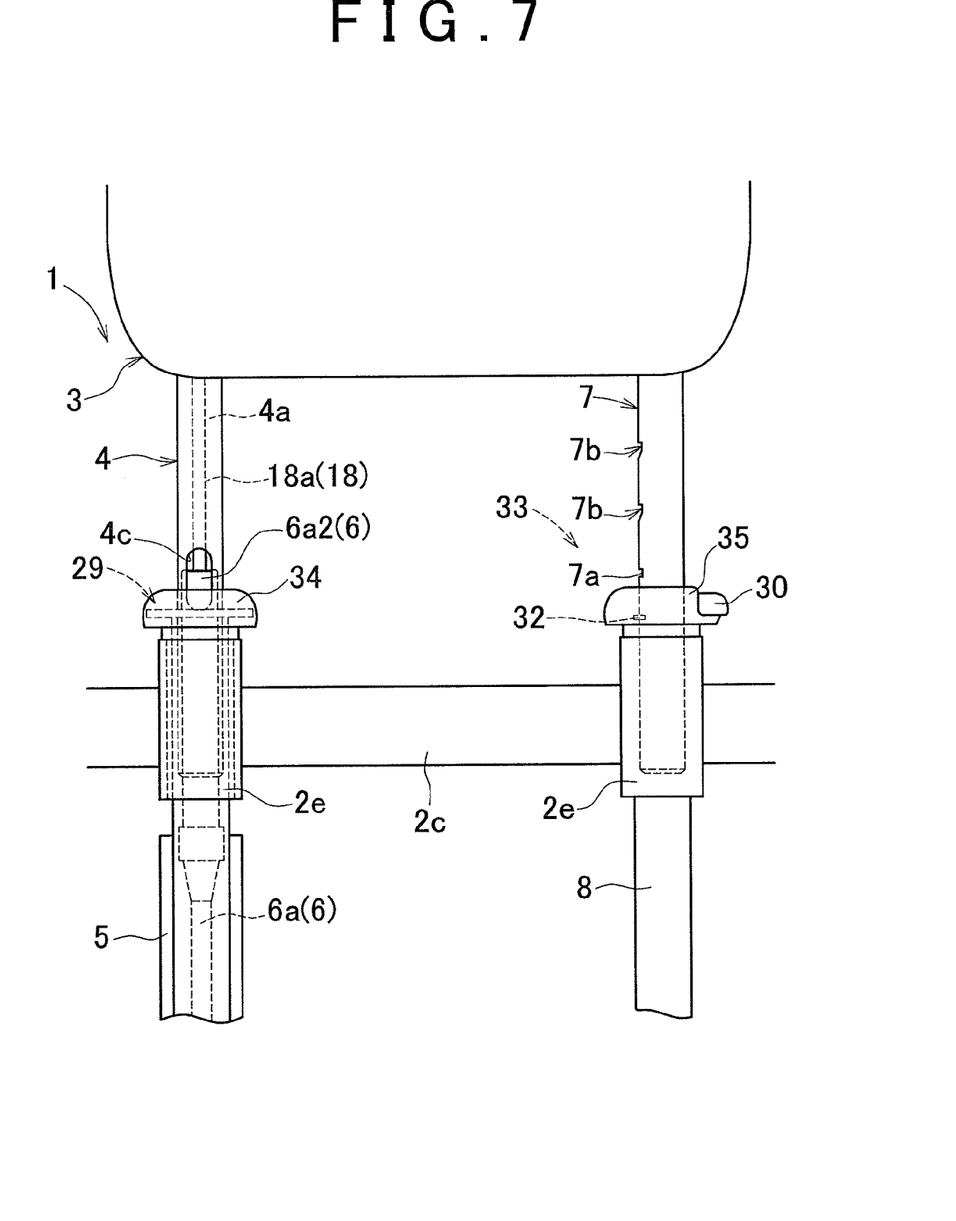
FIG. 7 is a front view of part of the vehicle seat when the stay is retained.

A position adjusting mechanism 33 is provided between the stay 7 and the support 8, as shown in FIGS. 5 to 7. The position adjusting mechanism 33 has grooves 7a and 7b formed in the stay 7, and a button 30 provided on the support 8 side. The button 30 is attached to a cap 34. The button 30 is urged by a spring 31 provided in the cap 34, such that a tip end portion 30a of the button 30 protrudes from an opening 35a formed in a side surface of the cap 34.

A metal pawl 32 is provided on a base portion of the button 30, as shown in FIGS. 5 and 6. This pawl 32 is able to be engaged with the grooves 7a and 7b of the stay 7 using the urging force of the spring 31. The grooves 7a and 7b are provided vertically juxtaposed in the stay 7. The groove 7b has an upper surface 7b1 that is generally orthogonal to the outer peripheral surface of the stay 7, and a sloped surface 7b2 that extends at an angle. The groove 7b is deep at the upper portion and gradually becomes shallower toward the lower portion. Therefore, when the pawl 32 is retained in the groove 7b, the stay 7 is allowed to move upward with respect to the support 8, but restricted from moving downward.

The lowest groove 7a has an upper surface 7a1 and a lower surface 7a2 that are generally orthogonal to the outer peripheral surface of the stay 7, as shown in FIGS. 5 and 6. Therefore, when the pawl 32 is engaged with the groove 7a, the stay 7 is restricted from moving either up or down with respect to the support 8. Therefore, the stay 7 is able to move upward with respect to the support 8 until the pawl 32 engages with the groove 7a. The pawl 32 is disengaged from the grooves 7a and 7b by pushing the button 30 against the spring 31, which enables the stay 7 to move downward with respect to the support 8. In this way, the position of the head rest 3 is able to be adjusted by the position adjusting mechanism 33.

A retaining mechanism 29 is provided between the stay 4 and the support 5, as shown in FIGS. 5 to 7. This retaining mechanism 29 has a retaining groove 4d formed in the stay 4, and a retaining pin 28 provided in the support 5. The retaining pin 28 is made of an elastically deformable metal and has a first piece 28a, a connecting piece 28b, and a second piece 28c. The first piece 28a and the second piece 28c are positioned in openings 5e and 5f formed in the support 5 and abut against the outer peripheral surface of the stay 4. The connecting piece 28*b* connects an end portion of the first piece 28*a* with an end portion of the second piece 28*c*, and extends to the outer peripheral surface of the support 5. Therefore, the retaining pin 28 abuts against the stay 4 while being restricted from moving up or down with respect to the support 5.

The retaining groove 4*d* has a lower surface 4*d*2 that is generally orthogonal to the outer peripheral surface of the stay 4, and a sloped surface 4*d*1 that extends at an angle, as shown in FIG. 3. The retaining groove 4*d* is deep at the lower portion and gradually becomes shallower toward the upper portion. When the retaining groove 4*d* is positioned in the opening 5*f* of the support 5, as shown in FIG. 6, the retaining pin 28 engages with the retaining groove 4*d*. In this state, the stay 4 is restricted from moving upward with respect to the support 5 by the retaining pin 28. Accordingly, the stay 4 is prevented from slipping upward from the support 5. Meanwhile, the stay 4 is allowed to move downward with respect to the support 5. Thus, the stay 4 can be moved downward.

A check hole 4*c* is formed in the stay 4, as shown in FIGS. 4 and 7. This check hole 4*c* is provided for checking whether the operating rod 18 is able to abut against the cable 6, and is therefore formed in the position where the operating rod 18 abuts against the cable 6. The check hole 4*c* passes through the shaft hole 4*a* and the outer peripheral surface of the stay 4, and is long in the axial direction. During normal use, the check hole 4*c* is in a concealed position that is not visible from the outside, as shown in FIG. 5. However, the check hole 4*c* moves to an exposed position that is visible from the outside by moving the head rest 3 higher from the seatback 2 than it is during normal use, as shown in FIG. 7.

That is, the head rest 3 is used (during normal use) with its position adjusted with respect to the seat back 2 by the position adjusting mechanism 33. At this time, the check hole 4*c* is below the cap 34 and inside the support 5. Therefore, the check hole 4*c* is in a concealed position that is not visible from the outside of the seat. Having the check hole 4*c* be in a concealed position makes it possible to prevent the check hole 4*c* from detracting from the appearance of the seat.

When the head rest 3 is moved upward beyond the position adjusting range while pushing the button 30, as shown in FIG. 7, the stay 4 is prevented from slipping out of the support 5 (i.e., retained) by the retaining mechanism 29. At this time, the check hole 4*c* is in an exposed position above the cap 34 and is thus visible from outside of the seat. Therefore, it is possible to look through the check hole 4*c* to check to see whether the cable 6 and the operating rod 18 are in a connected state (i.e., either abutted against one another or close to one another). Accordingly, it is possible to check to see whether the cable 6 and the operating rod 18 are in a connected state even after the stays 4 and 7 have been assembled in the supports 5 and 8.

Also, the vehicle seat 1 has two sets of stays and supports, i.e., a first set made up of the stay 7 and the support 8, and the second set made up of the stay 4 and the support 5, as shown in FIGS. 5 and 7. The position adjusting mechanism 33 is provided on the first set side, and the retaining mechanism 29 is provided on the second set side. The cable (i.e., the member assembled into the seat back) 6 and the operating rod (i.e., the member assembled into the head rest) 18 are positioned so that they can be connected together inside the stay 4 on the second set side, and the check hole 4*c* is formed in the second stay 4 on the second set side.

Accordingly, this construction is simpler than a construction in which the both mechanisms (29 and 33) are provided in a single set. Also, the cable 6 and the operating rod 18 are provided on the second set side which has the retaining mechanism 29 that is able to have a simpler construction than the position adjusting mechanism 33. Therefore, the cable 6 and the operating rod 18 pass through the stay 4 easier than they do when they are provided on the stay 7 (the first set side).

Also, as shown in FIG. 4, when the stay 4 is inserted into the support 5 while the end portion of the cable (i.e., the member assembled into the seat back) 6 is temporarily retained by the support 5, the end portion of the cable 6 is permanently retained by the stay 4, and the end portion of the cable 6 abuts against the operating rod (i.e., the member assembled into the head rest) 18 inside the stay 4.

As a result, it is possible to check the abutting state of the operating rod 18 and the cable 6 using the check hole 4*c*. It is also possible to check to see if the cable 6 has changed from being retained by the support 5 to being retained by the stay 4 by checking this abutting state. Further, the head rest 3 is brought closer to the head of the user by operating the cable 6 which moves the moving member 11 forward (see FIG. 9). As a result, it is possible to minimize a whiplash of the user.

The invention is not limited to the example embodiment described above. That is, other example embodiments, such as those described below, are also possible.

(1) The example embodiment described above has the cable (i.e., the member assembled into the seat back) 6 and the operating rod (i.e., the member assembled into the head rest) 18 which abut against (i.e., connect with) each other in the stay 4. However, other modes are also possible, such as a mode that has a pair of cables (i.e., a member assembled into the seat back and a member assembled into the head rest) that connect together inside the stay in order to transmit force (i.e., the movement of the cable 6), or a mode that has a pair of electric cables (i.e., a member assembled into the seat back and a member assembled into the head rest) that connect together inside the stay in order to transmit power or an electrical signal.

(2) The cable 6 in the example embodiment described above has the inner cable 6*b* and the outer cable 6*a*. The inner cable 6*b* changes from being retained by the support 5 via the pin 6*c* to being retained by the stay 4 via the pin 6*c*, and the outer cable 6*a* moves inside the stay 4. Alternatively, however, a pin may be provided on the outer cable, the outer cable may change from being retained by the support to being retained by the stay, and the inner cable may move inside the stay.

(3) The position adjusting mechanism 33 in the example embodiment described above allows the stay 7 to move upward and restricts the stay 7 from moving downward with respect to the support 8 by the shapes of the grooves 7*a* and 7*b*. Alternatively, however, the stay may be allowed to move upward and restricted from moving downward with respect to the support by a one-way mechanism having gears or the like.

(4) One end portion of the cable 6 in the example embodiment described above is temporarily retained by the support 5 and then permanently retained by the stay 4. Alternatively, however, one end portion of the cable may be directly retained by only the support or the stay.

(5) The check hole 4*c* in the example embodiment described above is located in the support 5 in a concealed position. Alternatively, however, the check hole may be located below the support in a concealed position.

(6) The example embodiment described above has the retaining mechanism 29 between the stay 4 and the support 5, and has the position adjusting mechanism 33 between the stay 7 and the support 8. Alternatively, however, the retaining mechanism and the position adjusting mechanism may be provided in the stay and support that are on the same side.

What is claimed is:

1. A vehicle seat having a seat back, a first stay and a second stay that are inserted into a first support and a second support of the seat back respectively, and a head rest that is attached to the seat back via the first and second stays, comprising:
   a position adjusting mechanism that adjusts positions of the first and second stays with respect to the first and second supports;
   a retaining mechanism that prevents the first and second stays from slipping out of the first and second supports at positions above positions at which the first and second stays are highest in a range within which the positions of the first and second stays are adjusted by the position adjusting mechanism; and
   a first member assembled into the seat back and a second member assembled into the head rest which are connected together inside the first stay,
   wherein a check hole for checking the connection state between the first member and the second member is formed in the first stay in such a position that the check hole is not visible from the outside of the seat when the first and second stays are in the range within which the positions of the first and second stays are adjusted by the position adjusting mechanism, and that the check hole is visible from the outside of the seat when the first and second stays are at the positions at which the first and second stays are prevented from slipping out of the first and second supports by the retaining mechanism.

2. The vehicle seat according to claim 1, wherein the position adjusting mechanism has an engagement portion, and
   when the engagement portion is engaged, the position adjusting mechanism allows the first and second stays to move upward with respect to the first and second supports and restrict the first and second stays from moving downward with respect to the first and second supports and, when the engagement portion is disengaged, the position adjusting mechanism allows the first and second stays to move downward with respect to the first and second supports.

3. The vehicle seat according to claim 1, wherein the position adjusting mechanism is provided between the second stay and the second support and the retaining mechanism is provided between the first stay and the first support.

4. The vehicle seat according to claim 1, wherein the head rest includes:
   a base member that attaches to the first and second stays;
   a moving member that is connected to the base member so as to move forward and backward with respect to the base member;
   an urging member that urges the moving member forward with respect to the base member;
   an initial-position keeping mechanism that keeps the moving member in an initial position with respect to the base member; and
   a release mechanism that unlocks the initial-position keeping mechanism and that includes the second member, and wherein
   the first member is a cable that is provided in the seat back, and when the first stay is inserted into the first support while an end portion of the cable is temporarily retained by the first support, the end portion of the cable is permanently retained by the first stay and the end portion of the cable abuts against the second member inside the first stay.

5. The vehicle seat according to claim 4, wherein the check hole is formed in the first stay in a position in which the end portion of the cable abuts against the second member when viewed from the side.

6. The vehicle seat according to claim 1, wherein the check hole is formed in the first stay in such a position that the check hole is below the top of the first support when the first and second stays are at the position at which the first and second stays are highest in the range within which the positions of the first and second stays are adjusted by the position adjusting mechanism, and that check hole is above the first support when the first and second stays are at the positions at which the first and second stays are prevented from slipping out of the first and second supports by the retaining mechanism.

* * * * *